United States Patent
Wang et al.

(10) Patent No.: US 7,417,232 B2
(45) Date of Patent: Aug. 26, 2008

(54) SYSTEMS AND METHODS FOR CAMERA CALIBRATION

(75) Inventors: Sharon Xiaorong Wang, Hoffman Estates, IL (US); James Frank Caruba, Bartlett, IL (US); James T. Chapman, Glen Ellyn, IL (US); Ronald E. Malmin, Chicago, IL (US); Joseph Fang, Barrington, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 320 days.

(21) Appl. No.: 11/454,320

(22) Filed: Jun. 16, 2006

(65) Prior Publication Data

US 2007/0018109 A1    Jan. 25, 2007

Related U.S. Application Data

(60) Provisional application No. 60/691,353, filed on Jun. 17, 2005, provisional application No. 60/595,959, filed on Aug. 19, 2005.

(51) Int. Cl.
*G01T 1/161* (2006.01)
*G01D 18/00* (2006.01)
*G12B 13/00* (2006.01)

(52) U.S. Cl. .............................. 250/363.09; 250/252.1; 250/363.04

(58) Field of Classification Search .............. 250/252.1, 250/363.04, 363.09, 370.11
See application file for complete search history.

(56) References Cited

U.S. PATENT DOCUMENTS

| 4,316,257 | A | 2/1982 | DelMedico et al. |
| 4,808,826 | A | 2/1989 | Lim et al. |
| 5,345,082 | A * | 9/1994 | Engdahl et al. ......... 250/363.07 |
| 5,513,120 | A | 4/1996 | Berlad |
| 6,559,450 | B1 | 5/2003 | Berlad et al. |
| 7,368,721 | B2 * | 5/2008 | Wang et al. ............. 250/363.06 |

* cited by examiner

*Primary Examiner*—David P. Porta
*Assistant Examiner*—Casey Bryant
(74) *Attorney, Agent, or Firm*—Peter L. Kendall (57) ABSTRACT

A method and system for calibrating a scintillation camera includes steps of constructing a pair of generic linearity coefficient (LC) matrices from a representative detector based on measurement of non-linearity; and transforming the pair of generic LC matrices according to measured pinhole locations from a lead mask to generate detector specific LC matrices.

33 Claims, 9 Drawing Sheets

SYSTEMS AND METHODS FOR CAMERA CALIBRATION

CROSS-REFERENCE TO RELATED APPLICATIONS AND CLAIM FOR PRIORITY

This application claims priority under 35 U.S.C. § 119(e) from Provisional Applications Ser. No. 60/691,353 filed Jun. 17, 2005 and Ser. No. 60/595,959 filed Aug. 19, 2005.

BACKGROUND OF THE INVENTION

1. Field of the Invention

The present invention relates generally to nuclear medical imaging devices and more particularly relates to calibration of scintillation cameras to enable correction of acquired image data for unavoidable distortions caused by the inherent physical characteristics of the detector and mask the scintillation camera.

2. Description of the Related Art

In various environments, such as in medical environments, imaging devices can include detectors that detect electromagnetic radiation emitted from radioactive isotopes or the like within a patient. The detectors typically include a sheet of scintillation crystal material that interacts with radiation, e.g., gamma rays emitted by the isotope to produce photons in the visible light spectrum known as light "events." The scintillation camera includes one or more photodetectors such as an array of photomultiplier tubes, which detect the intensity and location of the events and accumulate this data to acquire clinically significant images that are rendered on a computer display for analysis.

Existing scintillation cameras experience spatial distortion that requires linearity correction (LC). The spatial distortion arises from the fact that the spatial coordinates of light events occurring either at the edges of or between adjacent photomultiplier tubes in a photodetector array will be computed differently than the coordinates of events occurring directly over the center of a photomultiplier tube, due to the physical limitations of the photomultiplier tube. A significant amount of effort has been made to developing correction schemes for spatial or linearity distortion (along with, e.g., the companion energy and flood corrections).

In a Gamma camera, linearity and uniformity are two product specifications that measure image quality. It is desirous to achieve specifications exceeding the National Electrical Manufactures Association (NEMA) standards and better than prior art systems and methods.

A significant effort has been allocated to correction of spatial or linearity distortion using pinhole masks. For example, see copending U.S. patent application Ser. No. 11/165,786 entitled "Peak Detection Calibration For Gamma Camera Using Non-Uniform Pinhole Aperture Grid Mask," filed Jun. 24, 2005, assigned to the same assignee herein, the entire contents of which are incorporated by reference; copending U.S. patent application Ser. No. 10/951,324 entitled "Imaging Devices and Methods Employing Masks with a Non-Uniform Grid of Pinhole Apertures," filed Sep. 27, 2004, assigned to the same assignee herein, the entire contents of which are incorporated by reference; U.S. Pat. No. 6,559,450, the entire contents of which are incorporated by reference; U.S. Pat. No. 5,513,120, the entire contents of which are incorporated by reference; U.S. Patent No. 4,808,826, the entire contents of which are incorporated by reference; and U.S. Pat. No. 4,316,257, the entire contents of which are incorporated by reference.

Existing methods for the linearity correction are lengthy and generally consist of two steps: 1) Linearity Correction (LC) coefficient generation using images acquired with lead masks, and 2) LC coefficient modification using another flood by a gradient correction process to further improve the uniformity.

There are at least two problems associated with the approach. First, the gradient process improves the uniformity at the expense of the linearity. Often the better uniformity it achieves, the worse the linearity becomes. Second, the two-step process is the most time consuming procedure in the camera calibration process. Further, prior calibration methods were designed for the masks with well-separated data points along a rectangular grid and are not suitable for a new mask that has much denser population of pinhole aperture with non-uniform grid.

Therefore, there is a need for new and improved systems and methods for the correction of spatial or linearity distortion in scintillation camera.

SUMMARY OF THE INVENTION

This invention includes a system and method for scintillation camera calibration that solve the above and other problems with the prior art. According to one embodiment of the present invention, first a pair of generic LC coefficient matrices is constructed from a representative detector by using accurate measurement of non-linearity at an extra high sampling rate. Then for a selected detector, a morphological transformation is applied to the generic LC matrices, according to the measured pinhole locations from a lead mask, to warp the generic LC matrices for the selected detector. The summation of the morphological transformation and the morphed generic LC matrices generate detector specific LC matrices.

According to one embodiment of the present invention, a method for generating LC coefficients for a scintillation camera includes constructing a pair generic linearity coefficient (LC) matrices from a representative detector based on measurement of non-linearity; and transforming the pair of generic LC matrices according to measured pinhole locations from a lead mask to generate detector specific LC matrices.

The LC matrices can be further refined by adding residual errors through a feedback operation. To reduce the interpolation errors due to high non-linearity distortions at the edges of detector, a group of virtual points may be added to the peripheral area of the points derived from the pinholes on the lead mask. Finally, a virtual LC ring mask and a planar fit technique can be applied to smooth the edges, and the LC matrices to the specification detector under concern are generated, which achieve the best linearity and uniformity simultaneously.

Further applications and advantages of various embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 8:
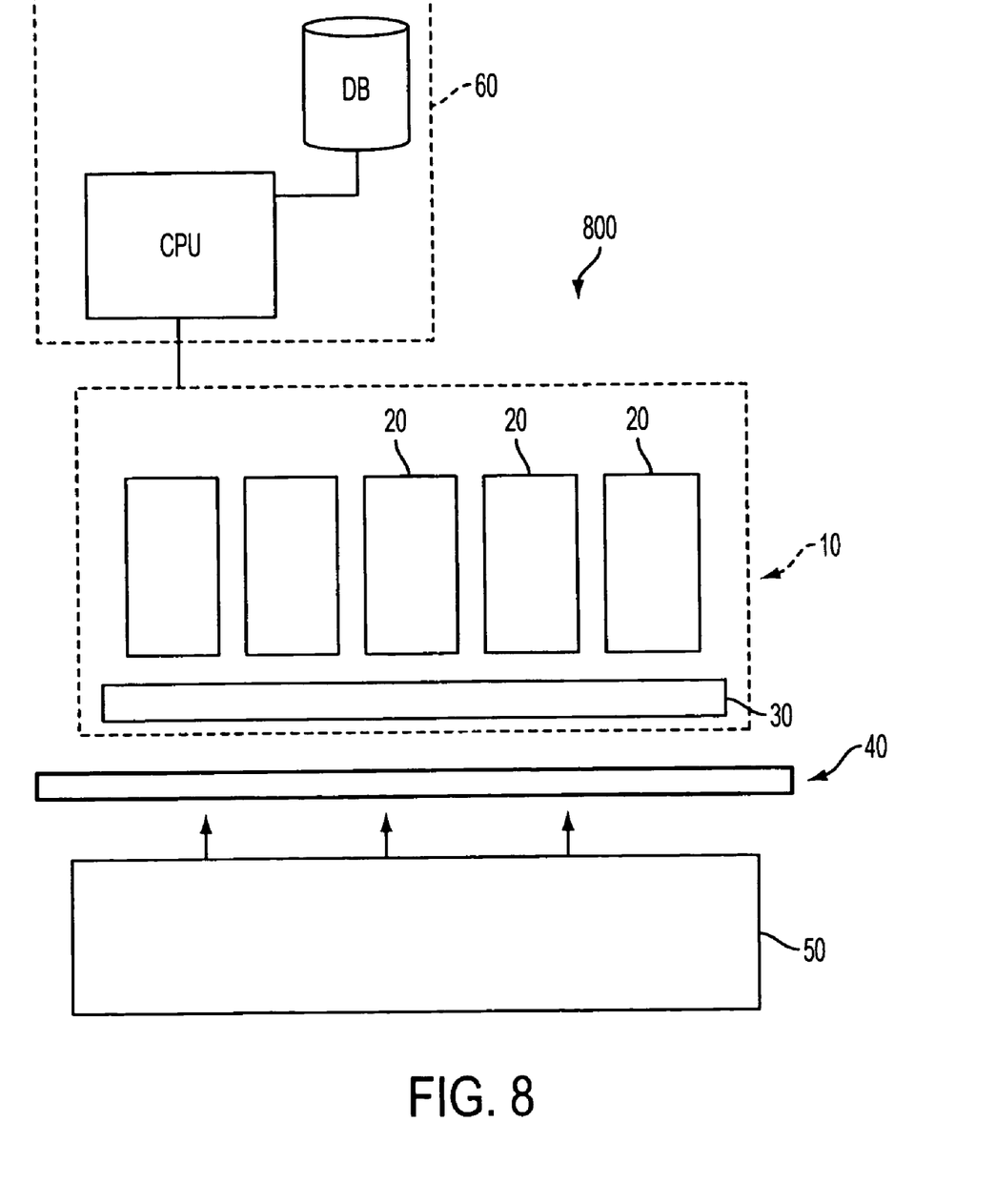
FIG. 8 is a block diagram of an exemplary scintillation camera in which one or more aspects of the present invention may be employed or implemented.

FIG. 8 is a block diagram of an exemplary scintillation camera in which one or more aspects of the present invention may be employed or implemented. The device 800 includes a detector or camera 10, a mask 40, a radiation source 50, and a computer processor 60. The camera 10 typically includes a scintillation crystal 30 and an array of photo-multiplier tubers 20. The radiation source 50 outputs radiation (e.g., gamma rays), which penetrate a subject being imaged (not shown) that contact the mask 40. The mask 40 has a number of pin-holes which allow radiation to pass through the mask and interact with the scintillation crystal 30. The gamma rays react with the crystal 40, which produces light events or flashes of multiple photons. The light from the crystal 40 is detected by the photomultiplier tubes 20, which output a signal proportional to the energy of the gamma. These output signals are analyzed by the processor 60 to produce an image of the subject. The processor 60 may include one-or more CPU's 60A and one or more memory storage devices 60B (e.g., disk), and is configured to implement linear correction of the output signals according to the processes described herein.

According to a preferred embodiment of the invention, the mask 40 can produce accurate flood images for obtaining spatial linearity correction factors to correct the apparent position of a detected scintillation event to its actual position with high accuracy and reliability. In the preferred embodiments, the mask 40 includes a non-uniform array of pinhole apertures that can achieve this goal. (See FIG. 9b).

In use, a uniform flood or point source of radiation causes each pinhole aperture of the mask 40 to illuminate a scintillation crystal 30 with gamma photons. The camera then records the apparent location of the resulting light events in the crystal 30. The non-uniform grid of pinholes is designed so that the image produced can facilitate highly accurate points for location detection. Costs related to camera calibration can be substantially reduced and/or NEMA (National Electrical Manufacturers Association) gamma camera linearity specifications can be substantially improved upon. Various embodiments can be used in various nuclear medicine cameras, such as those manufactured by SIEMENS CORPORATION, GENERAL ELECTRIC, PHILIPS and various others entities. Various embodiments may also be used in a variety of radiation and/or other applications where a calibration process is used. In some embodiments, new LC procedures can provide significant time and/or material savings while preserving and/or even improving the detector's performance, exceeding the NEMA requirements.

Figure 9A:
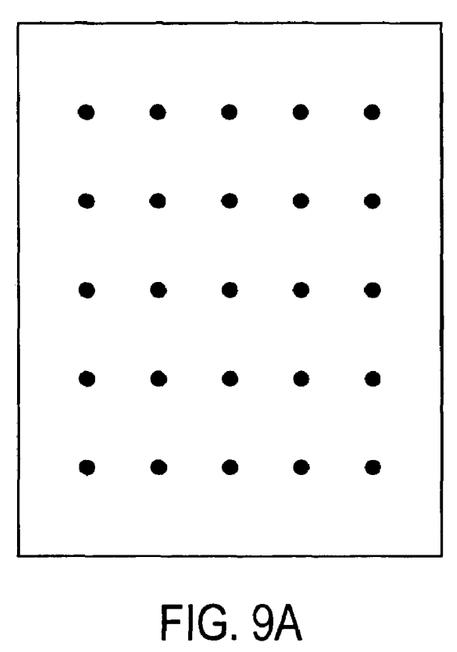
FIGS. 9(a) and (b) illustrate two different alignments of pin-holes in masks.
Figure 9B:
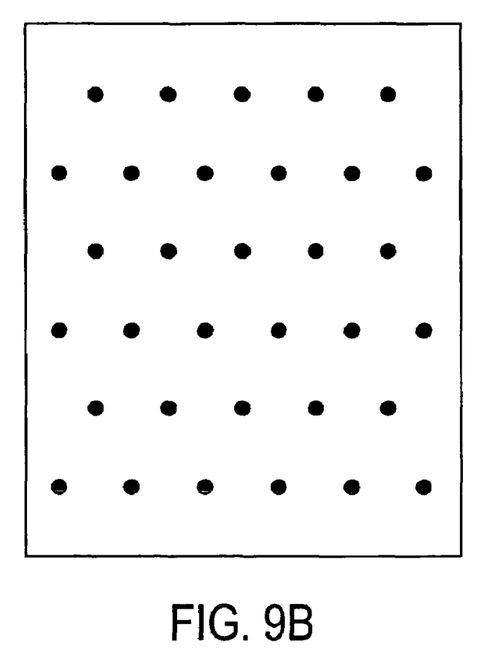
Figure 10:
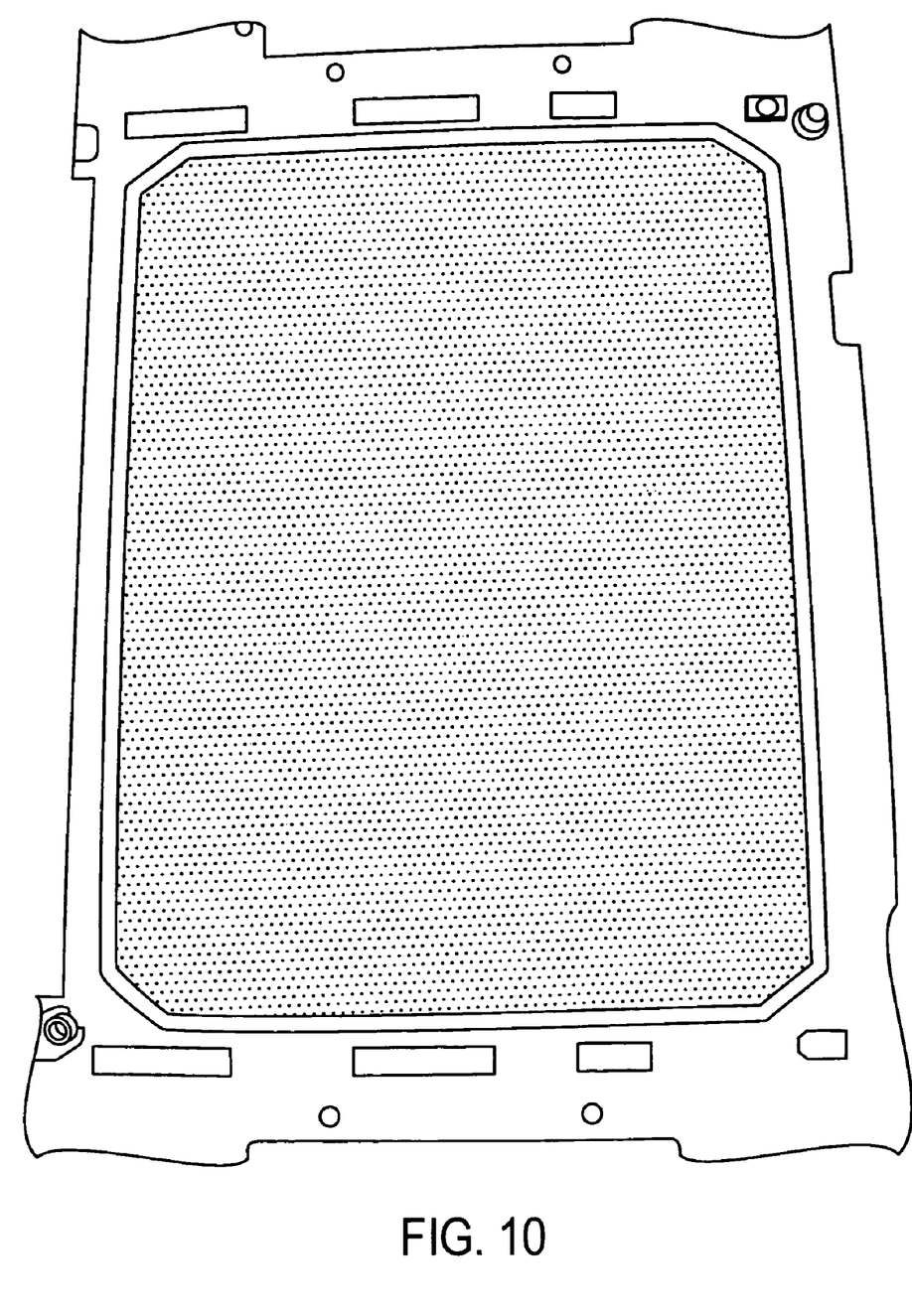
FIG. 10 is an image of an exemplary mask.

Aforementioned copending U.S. Patent Application entitled "Imaging Devices and Methods Employing Masks with a Non-Uniform Grid of Pinhole Apertures," discloses a novel calibration mask which may be used in accordance with an embodiment of the present invention. As shown in FIG. 9b, the lead mask has an array or grid of pinhole apertures (i.e., small apertures) that are arranged in a non-rectangular distribution. Here, "rectangular distribution" means an arrangement like that shown in FIG. 9a of this application. In preferred embodiments, the lead mask has a non-uniform distribution of pinhole apertures. An exemplary mask is shown in FIG. 10.

The array or grid of apertures is preferably designed in such way that the mask can perform as many tasks as possible—thus, for example, providing robustness to crystal variation and/or photomultiplier tube (PMT) location offset.

Some of the benefits include:

1. Reducing a substantial amount of calibration time (e.g. eliminating about 75 minutes of the calibration time per detector or even more).
2. Reducing the amount of masks and/or materials used (e.g. avoiding the need for separate masks in some existing systems that use x and y line masks and a ROI mask).
3. Reducing complexity of the calibration process by combining x and y line acquisition, and/or eliminating ROI, and/or eliminating centering and/or gain processes.
4. Increasing the number of data points (such as by providing about 119% more data points for ⅜" and/or ⅝" detectors and/or about 54% more data points for 1" detectors). Notably, increasing the data points can increase the initial LC accuracy, which can benefit uniformity gradient processing and the final linearity.
5. Reducing the calibration failure rate (for example, by using a non-uniform grid, which can generate a more uniform image for tolerance of variation and/or drift near the edges). Notably, this can be particularly advantageous for re-burn of 1" detectors.
6. Increasing the LC accuracy at the edges (such as, e.g., by providing data points outside of Field of View [FOV]).

As indicated above, in a preferred embodiment, a lead mask is provided with a non-rectangular distribution of pinhole apertures. As discussed above, in use, a uniform flood or point source of radiation causes each aperture to illuminate a scintillation crystal. Then, a camera records the apparent location of the event in the crystal. The non-uniform grid of pinholes is designed in such a way that the image produced can facilitate highly accurate points for location detection.

Because the image size is typically about 256×256 pixels or larger, it is desirable to have more data points on the mask. However, the number of pinholes is limited by the spacing between points. For example, when two pinholes are too close together, their signals may contaminate each other and cause peak location algorithm failure.

In this regard, the use of a non-rectangular distribution of apertures can be advantageous. For example, as compared with rectangular distributions, hexagonal distributions can be used that allow a denser arrangement of pinholes on the mask where the spacing between holes is the same. Referring to FIGS. 9(A) and 9(B), the hexagonal distribution of FIG. 9(b) can provide about 56% more data points than the rectangular distribution of FIG. 9(a) within a similar region. In particular, in these illustrative examples, FIG. 9(a) shows an array or grid having a rectangular distribution with 20 data points and FIG. 9(*b*) shows an array or grid having a hexagonal distribution with 39 data points (with equal spacing between data points in these figures).

While FIG. 9(*b*) shows one preferred embodiment using a hexagonal distribution of apertures, other non-rectangular distributions can be employed in other embodiments. By way of example, while hexagonal distributions can include apertures at vertices of a six-sided polygon, other embodiments can include apertures at vertices of other n-sided polygons (where n is a number other than 4). Additionally, other distributions can be utilized, such as where apertures are not at vertices of n-sided polygons depending on circumstances.

Figure 1:
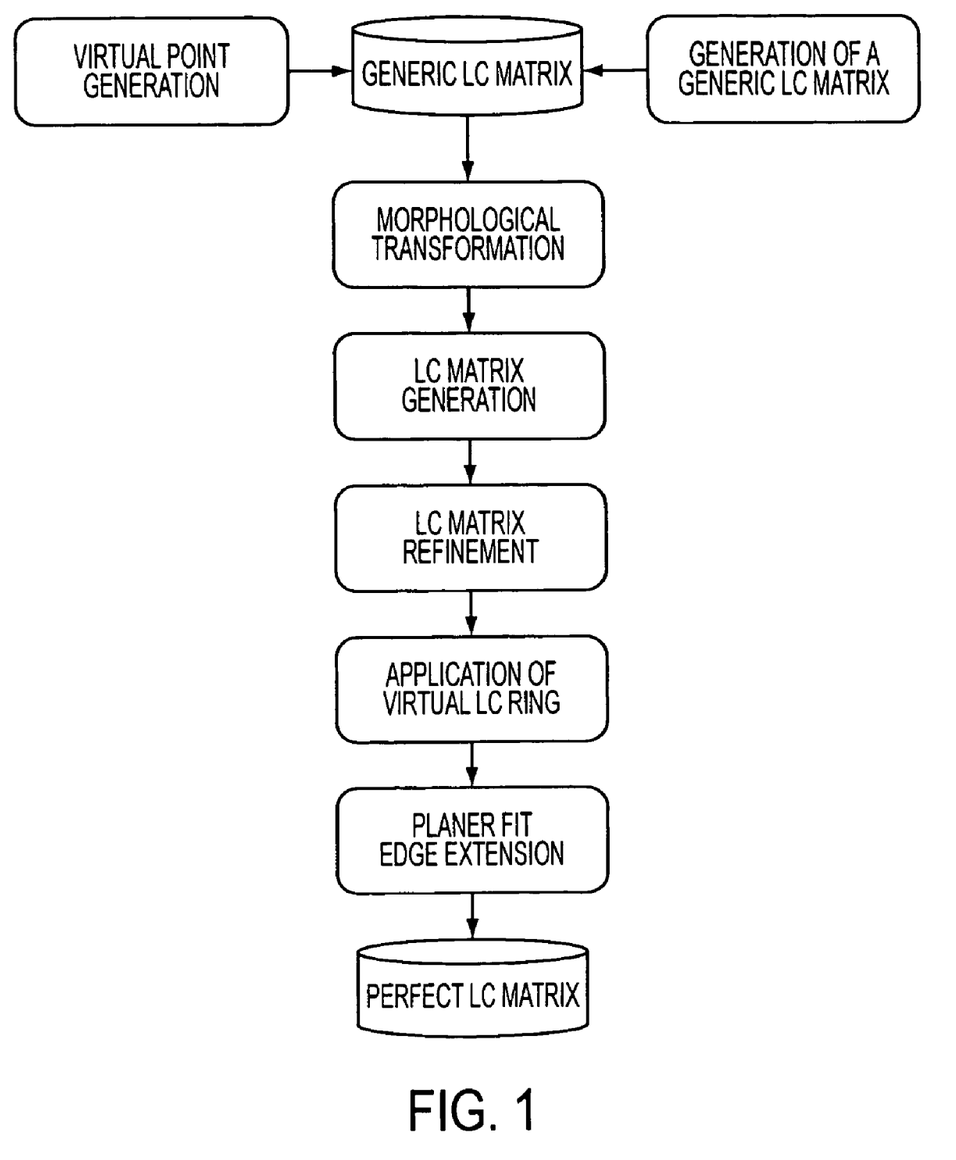
FIG. 1 is a flow chart of an LC process according to an embodiment of the present invention.

The present invention includes a novel system and method for the accurate correction of spatial or linear distortion caused by such lead masks in scintillation cameras. Referring to FIG. 1, a method includes a step of constructing a pair of generic LC coefficient matrices from a representative detector by using accurate measurement of non-linearity at an extra high sampling rate. Then for a specified detector under concern, a morphological transformation is applied to the generic LC matrices, according to measured pinhole locations from the lead mask of the specified camera. The summation of the morphological transformation and the morphed generic LC matrices generates the detector specific LC matrices.

The new LC matrices can be further refined by adding residual errors through a feedback operation. To reduce the interpolation errors due to high non-linearity distortions at the edges of detector, a group of virtual points can be added to the peripheral area of the points derived from the pinholes on the lead mask. Finally, a virtual LC ring mask and a planar fit technique are applied to smooth the edges, that the perfect LC matrices to the specification detector under concern are generated, which achieve the best linearity and uniformity simultaneously.

The steps of the invention; which are described in further detail below, may be implemented with well known programming techniques with any combination of software and hardware adapted to scintillation cameras of the present invention. For example, processor 60 could be a personal computer.

The generic LC matrix is used as a starting point for the calibration of any individual detector, and therefore, it should represent the non-linearity typical to the crystal and PMT of that category of detectors. For this purpose, a representative detector is selected as a representative detector. The representative detector is irradiated with a mask and events are measured at an extra high sampling rate such that the spacing between samples is smaller than the actual LC matrix. A LC matrix is constructed that captures the information of the over-sampled non-linearity. An adaptive Gaussian interpolation was developed for this purpose.

For the $j_{th}$ point sampled, denote $\sigma x$; and $\sigma y$; as the maximum spacing of the neighboring points sampled in the x and y directions respectively, then a Gaussian kernel can be defined as $$G_j(x \cdot y) = e^{-\frac{1}{2}U_j}; \quad (1)$$

where the elliptical function is:

$$U_j = \left(\frac{x - x_j}{\sigma_{xj}}\right)^2 + \left(\frac{y - y_j}{\sigma_{xj}}\right)^2; \quad (2)$$

and if $\alpha$ denotes a scaling factor then $$\sigma_{xj} = \alpha \delta x_j, \quad \sigma_x = \alpha \delta y_j. \quad (3)$$

The non-linearity for the jth point in x and y directions is defined as $Dx_j$ and $Dy_j$, respectively, then the LC matrixes can be calculated as $$LX = \sum_j G_i(x_g y) Dx_i(x \cdot y), \quad LY = \sum_j Gi(x_g y) Dy_i(x, y). \quad (4)$$

Figure 2A:
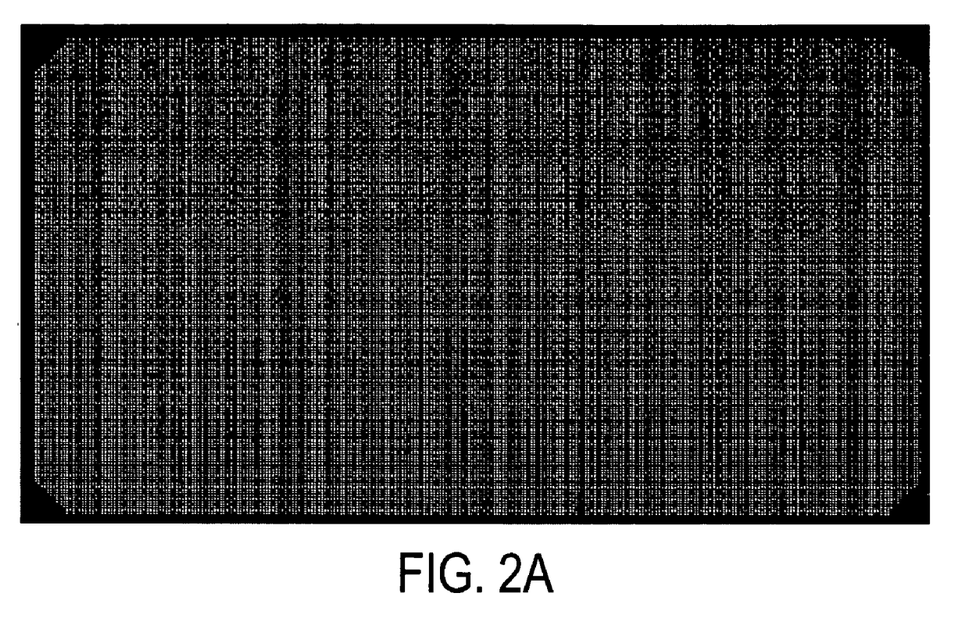
FIGS. 2(a)-(b) show the sampling locations of a representative detector and the responses measured from the same detector, respectively.
Figure 2B:
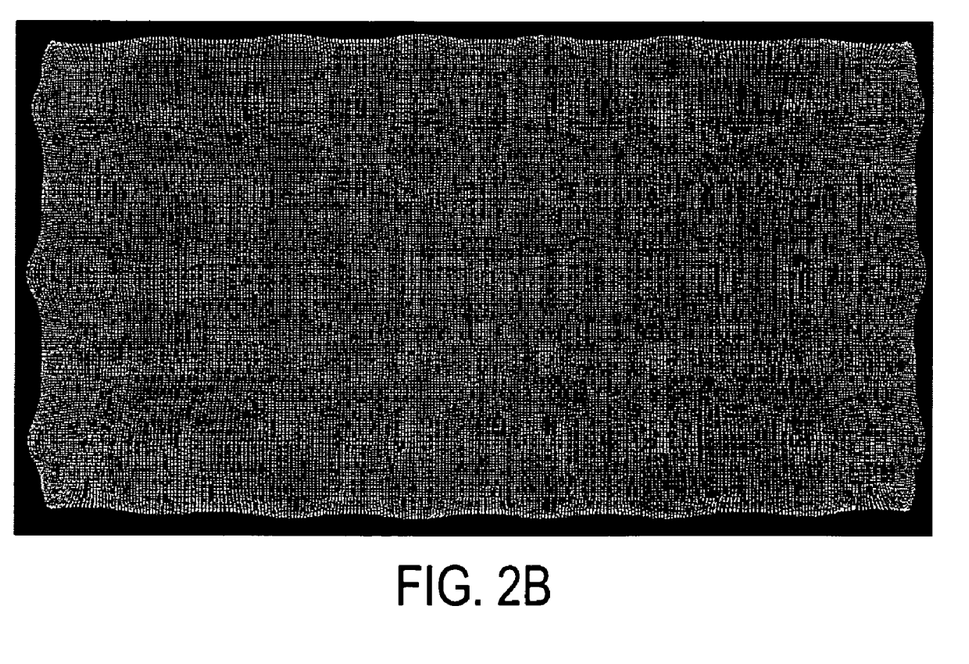
Figure 3A:
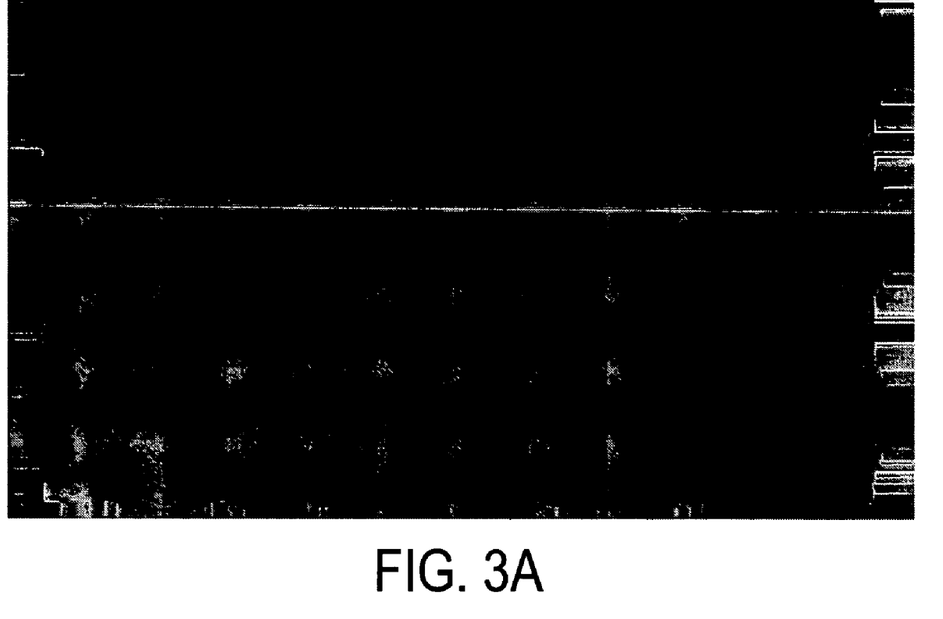
FIGS. 3 shows generic LC matrices in x and y directions respectively, which are weighted differences of the sample locations of FIGS. 2 (a) and (b) using Gaussian kernels.
Figure 3B:
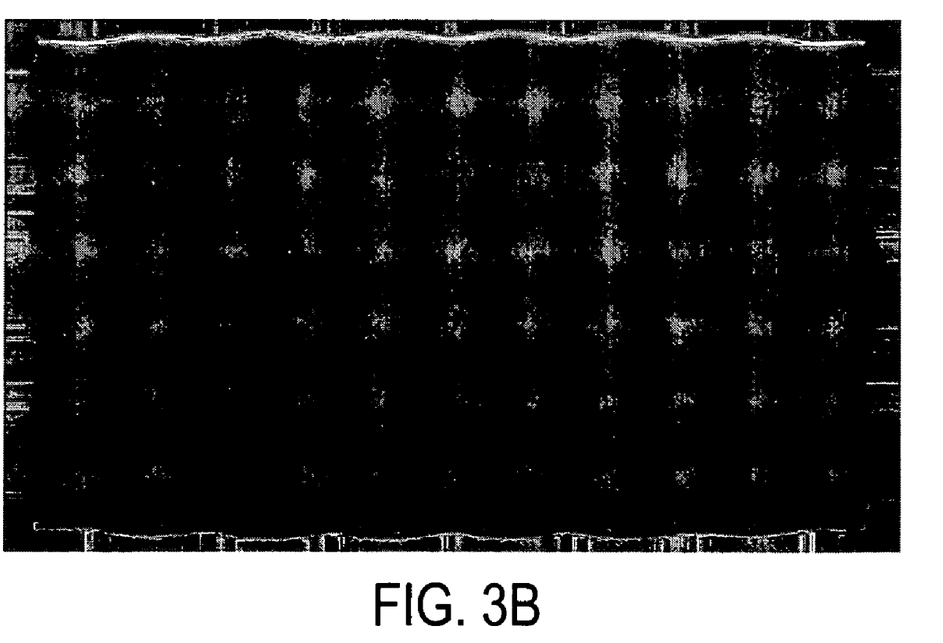

FIG. 2(*a*) shows the sampling locations of a representative detector while (*b*) the responses measured from the same detector. FIG. 3 shows generic LC matrices in x and y directions respectively, which are weighted differences of the sample locations of FIGS. 2(*a*) and (*b*) using Gaussian kernels described as Equation (4).

2) Morphological Transformation

Generic LC matrices should be warped to fit into a specific detector to be calibrated. To achieve this, a morphological transformation is applied. This transformation may be expressed as $$\hat{x} = r(x, y); \quad (5)$$

and $$\hat{y} = s(x, y). \quad (6)$$

Figure 4:
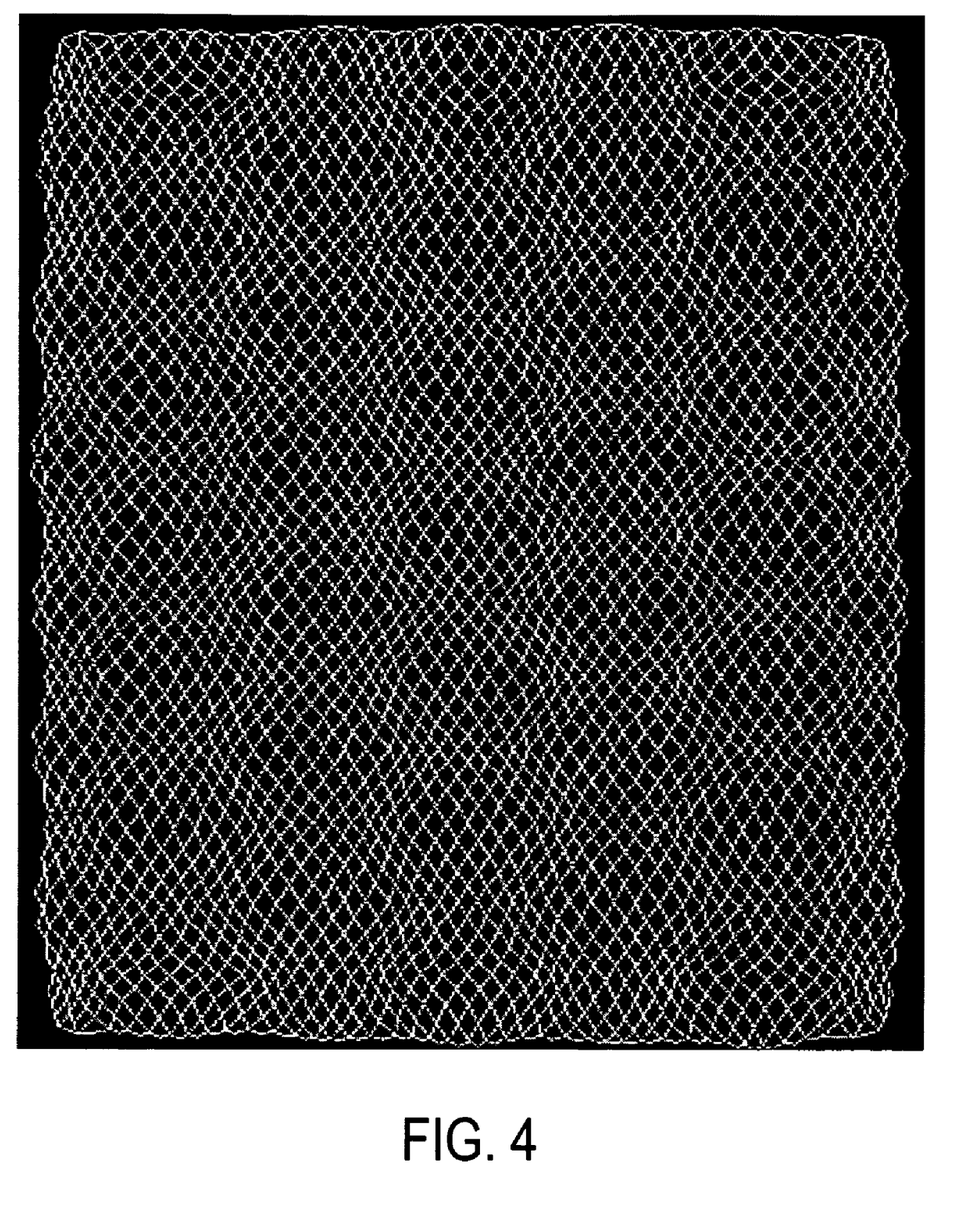
FIG. 4 shows an exemplary mesh.

First, a grid mesh is formed using the centers of pinholes on the lead mask as the vertices from the generic LC matrix of the representative detector. FIG. 4 shows an exemplary mesh formed by this means. When calibrating a new detector, a corresponding mesh is generated using the measured pinhole centers of the same vertices. For each quadrilateral regions, a pair of bi-linear equations can be modeled so that $$r(x, y) = c_1 x + c_2 y + c_3 xy + c_4; \quad (7)$$

and $$s(x, y) = c_5 x + c_6 y + c_7 xy + c_8. \quad (8)$$

Since there are total eight known tie points, four on the mesh of generic LC matrix and four on measured detector matrix, these equations can be easily solved for the eight coefficients $c_i$, i=1, 2, ... 8. The coefficients constitute the model used to transform all pixels within the quadrilateral region characterized by the tie points used to obtain the coefficients.

Finally, the warped generic LC matrix can be expressed as $$\hat{L}CX = g_x(\hat{x}, \hat{y}) \text{ and } \hat{L}CY = g_y(\hat{x}, \hat{y}). \quad (9)$$

3) The LC Coefficient Matrix Generation

Although LC matrices in Equation (9) have been geometrically registered to a specific detector to be calibrated, its value still to be modified to reflect the change from the representative detector to this particular detector. Since at each vertex the difference of warping is known, a simple bi-linear interpolation generates the matrix of Dx and Dy, where $D\hat{x}(\hat{x}, \hat{y}) = (\hat{x} - x)$ and $D\hat{y}(\hat{x}, \hat{y}) = (\hat{y} - y)$. Then the combined LC matrix can be written as $$LCX = g_x(\hat{x}, \hat{y}) + D\hat{x}(\hat{x}, \hat{y}); \quad (10)$$

and $$LCY = g_y(\hat{x}, \hat{y}) + D\hat{y}(\hat{x}, \hat{y}). \quad (11)$$

4) Refinement of LC Coefficient Matrix

The LC coefficients in Equations (10) and (11) can be further corrected by adding a feedback loop. First, applying the coefficients of LCX and LCY to the measured pinhole locations on the lead mask generates a set corrected coordinates, then subtracting them from the ideal coordinates of the pinhole locations gives the residue errors. Adding the residue errors to the coefficient matrix LCX and LCY results in the final LC coefficients. It should be pointed out although only a bi-linear interpolation is employed in the computation; the higher order of non-linearity has been taken into the consideration by the measurement of the representative detector and warping process. Therefore, the interpolation is applied to the difference of LC coefficients, which is small and can be considered as linear. This way the interpolation error was reduced and the final coefficients meet the can meet of both linearity and uniformity.

5) Virtual Points and Virtual LC Ring

Figure 5:
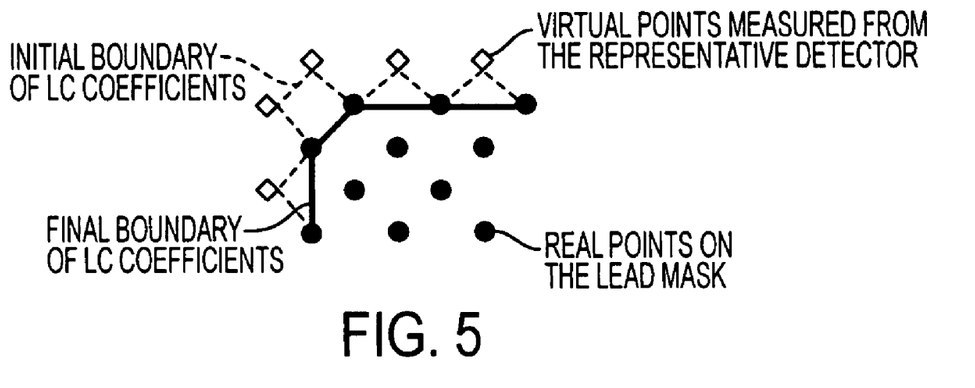
FIG. 5 shows an example of a group of virtual points being added to the peripheral area of the measured points.

LC coefficients change drastically at the edge of detector, but it is hard to measure because of the structural limitations of the lead mask. To solve the problem, a group of virtual points can be added to the peripheral area of the measured points, as shown in FIG. 5. The LC coefficients of the virtual points were measured initially on the representative detector and further corrected using the same warping operation as described above). The virtual points extend the correction area and therefore, improve the image quality at the edge.

Figure 6:
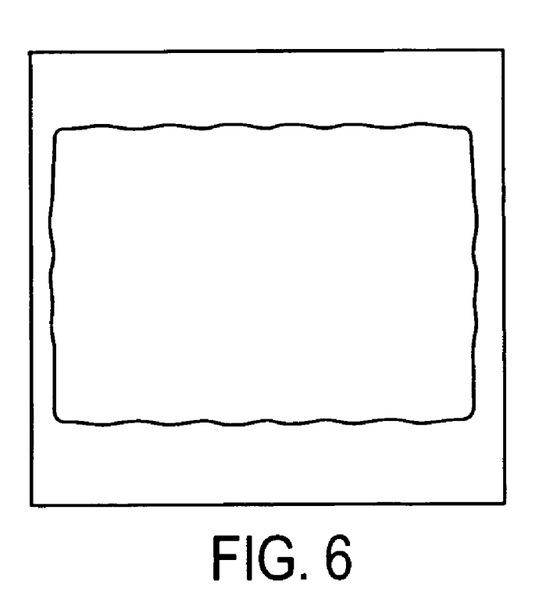
FIG. 6 shows an exemplary mask generated from a virtual LC ring of the present invention.

At this point, the boundary of LC coefficients are defined by the mesh with real and virtual vertices. One problem it has is "toothy" artifacts observed in the flood images. To eliminate these artifacts, a virtual LC ring is generated as if there were a real ring mask that produces a well-defined boundary. Connecting all real points at the boundaries generates the virtual LC ring mask, whose value is equal to 1 inside of the lines and 0 otherwise. Multiplying the virtual mask with the coefficient matrix generates LC coefficients that produces flood image with smooth edges.

6) Edge Extension with Planar Fit

To correct for events that occur beyond the virtual LC ring where linearity has been measured, coefficients need to be extended to the whole matrix. A planar fit algorithm was developed to accomplish the task. The planar fit extends the coefficients outside the virtual LC ring by fitting a plane to the defined points at the very edge of die defined region. The planar extrapolation is grown by extrapolating the linearity coefficient for undefined points in order of their distance from the defined region. This simple technique provides continuous extension of the coefficient edge region.

Figure 7A:
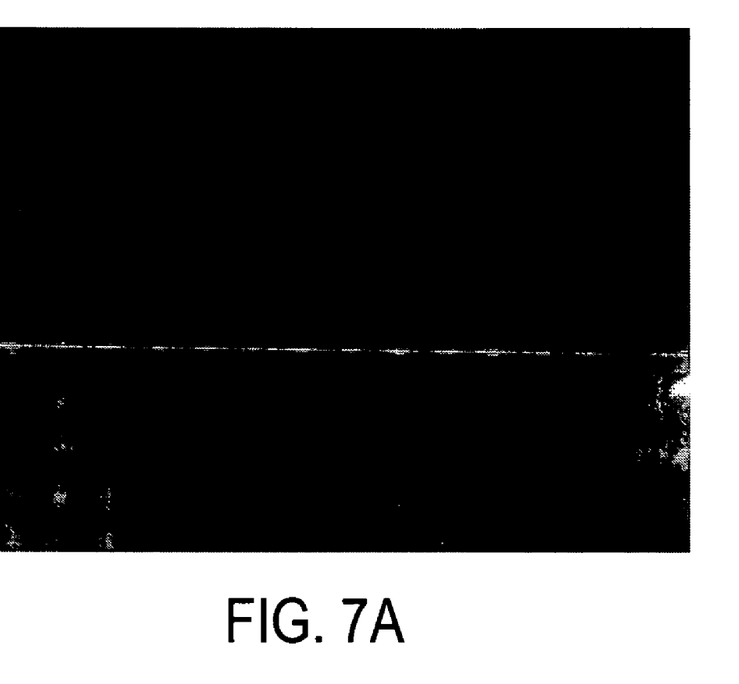
FIGS. 7(a) and (b) show the final LC coefficient matrices in x and y directions respectively.
Figure 7B:
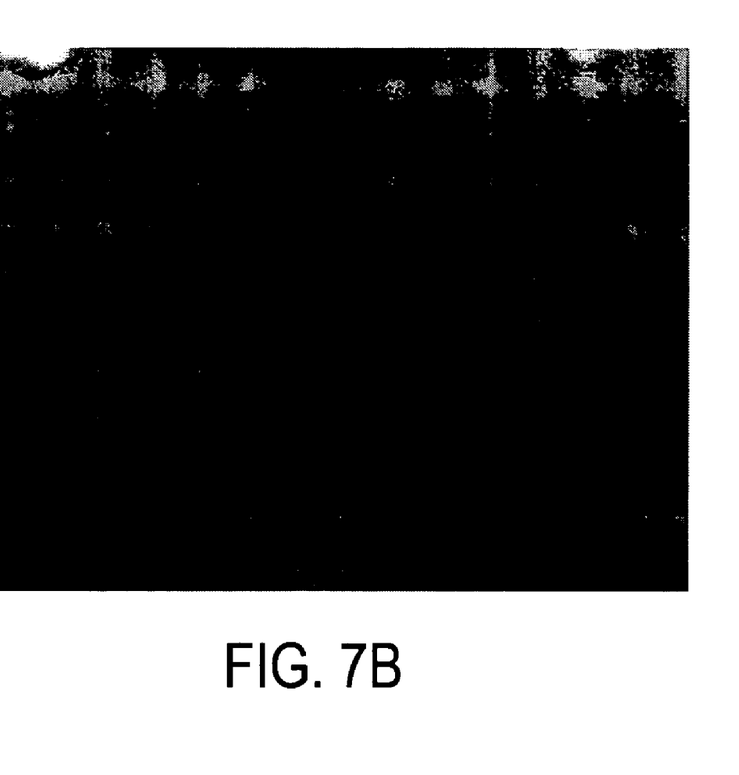

FIG. 7 shows the final LC coefficient matrices in x and y directions respectively.

7) Correction of the Generic LC

Since the LC matrices obtained form the representative detector carries the detector specific features, it is desirable that these features are removed so that the generic LC more accurately represent an ideal detector. After calibrating a large number of detectors, the LC matrices can be used to cancel out the error statistically. First, averaging the pinhole locations on each detector generates an ideal grid of mesh. Then the LC matrices of each detector are warped to the ideal grid. Averaging the LC matrices will generate a pair of ideal LC matrices, in which detector specific features are cancelled out while nonlinearity caused by the thickness of crystal and PMT design are left. The ideal LC matrices do not introduce detector specific defects, and therefore, produce more accurate corrections for the detectors to be calibrated.

One skilled in the art will readily understand that the above method may be implemented in a scintillation camera by software, firmware or hardware, or a combination thereof.

Thus, according to another aspect of the invention, a scintillation camera is provided which is configured to perform LC correction in accordance with the present invention.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

What is claimed is:

1. A method of calibrating a scintillation detector having a lead mask with non-uniform pin-holes, comprising the steps of:
    (a) constructing a pair of generic linearity coefficient (LC) matrices from a representative detector based on a measurement of non-linearity; and
    (b) transforming the pair of generic LC matrices according to measured pinhole locations from the lead mask, thereby generating detector specific LC matrices of the detector to be calibrated.

2. The method of claim 1, further comprising a step of (c) adding residual errors to the generated detector specific LC matrices to generate refined detector specific LC matrices.

3. The method of claim 1, wherein step (a) includes selecting a representative detector, measuring said representative detector at an extra high sampling rate such that the spacing between samples is less than the spacing of the actual LC matrix, and constructing an LC matrix from an adaptive Gaussian interpolation.

4. The method of claim 1, wherein step (b) includes forming a grid mesh by using centers of pinholes on the lead mask as vertices from the generic LC matrix of the representative detector.

5. The method of claim 4, wherein step (b) further includes solving a pair of bi-linear equations to warp the generic LC matrix to the measured detector matrix to geometrically register the LC matrices to the detector to be calibrated.

6. The method of claim 5, wherein step (b) further includes performing a bi-linear interpolation of the geometrically registered the LC matrices.

7. The method of claim 6, further comprising a step of adding virtual points to peripheral areas of the measured points.

8. The method of claim 7, further comprising a step of generating a virtual LC ring and connecting all real points at the boundaries to generate a virtual LC ring mask; and multiplying the virtual mask with the coefficient matrix.

9. The method of claim 8, further comprising the step of applying a planar fit edge extension algorithm to the coefficient matrix to extend correction to edges of the detector.

10. A method of calibrating a scintillation detector having a lead mask with non-uniform pin-holes, comprising:
    (a) a step of constructing a pair of generic linearity coefficient (LC) matrices from a representative detector; and
    (b) a step of transforming the pair of generic LC matrices, thereby generating detector specific LC matrices of the detector to be calibrated.

11. The method of claim 10, further comprising (c) a step for adding residual errors to the generated detector specific LC matrices to generate refined detector specific LC matrices.

12. The method of claim 10, wherein step (a) includes selecting a representative detector, measuring said representative detector at an extra high sampling rate such that the spacing between samples is less than the spacing of the actual LC matrix, and constructing an LC matrix from an adaptive Gaussian interpolation.

13. The method of claim 10, wherein step (b) includes forming a grid mesh by using centers of pinholes on the lead mask as vertices from the generic LC matrix of the representative detector.

14. The method of claim 13, wherein step (b) further includes solving a pair of bi-linear equations to warp the generic LC matrix to the measured detector matrix to geometrically register the LC matrices to the detector to be calibrated.

15. The method of claim 14, wherein step (b) further includes performing a bi-linear interpolation of the geometrically registered the LC matrices.

16. The method of claim 15, further comprising a step of adding virtual points to peripheral areas of the measured points.

17. The method of claim 16, further comprising a step of generating a virtual LC ring and connecting all real points at the boundaries to generate a virtual LC ring mask; and multiplying the virtual mask with the coefficient matrix.

18. A system for calibrating a scintillation detector having a lead mask with non-uniform pin-holes, comprising:
a processor unit configured to construct a pair generic linearity coefficient (LC) matrices from a representative detector; and configured to transform the pair of generic LC matrices, generating detector specific LC matrices of the detector to be calibrated.

19. The system of claim 18, wherein said processor unit is further configured to add residual errors to the generated detector specific LC matrices to generate refined detector specific LC matrices.

20. The system of claim 18, wherein said processor unit is further configured to select a representative detector, measure said representative detector at an extra high sampling rate such that the spacing between samples is less than the spacing of the actual LC matrix, and construct an LC matrix from an adaptive Gaussian interpolation.

21. The system of claim 18, wherein said processor unit is further configured to form a grid mesh by using centers of pinholes on the lead mask as vertices from the generic LC matrix of the representative detector.

22. The system of claim 18, wherein said processor unit is further configured to solve a pair of bi-linear equations to warp the generic LC matrix to the measured detector matrix to geometrically register the LC matrices to the detector to be calibrated.

23. The system of claim 22, wherein said processor unit is further configured to perform a bi-linear interpolation of the geometrically registered the LC matrices.

24. The system of claim 23, wherein said processor unit is further configured to add virtual points to peripheral areas of the measured points.

25. The system of claim 24, wherein said processor unit is further configured to generate a virtual LC ring and connecting all real points at the boundaries to generate a virtual LC ring mask; and multiplying the virtual mask with the coefficient matrix.

26. A system for calibrating a scintillation detector having a lead mask with non-uniform pin-holes, comprising:
a means for constructing a pair of generic linearity coefficient (LC) matrices from a representative detector based on a measurement of non-linearity; and
a means for transforming the pair of generic LC matrices according to measured pinhole locations from a lead mask, thereby generating detector specific LC matrices of the detector to be calibrated.

27. The system of claim 26, further comprising means for adding residual errors to the generated detector specific LC matrices to generate refined detector specific LC matrices.

28. The system of claim 26, further comprising means for selecting a representative detector, measuring said representative detector at an extra high sampling rate such that the spacing between samples is less than the spacing of the actual LC matrix, and constructing an LC matrix from an adaptive Gaussian interpolation.

29. The system of claim 26, further comprising means for forming a grid mesh by using centers of pinholes on the lead mask as vertices from the generic LC matrix of the representative detector.

30. The system of claim 29, further comprising means for solving a pair of bi-linear equations to warp the generic LC matrix to the measured detector matrix to geometrically register the LC matrices to the detector to be calibrated.

31. The system of claim 30, further comprising means for performing a bi-linear interpolation of the geometrically registered the LC matrices.

32. The system of claim 31, further comprising means for adding virtual points to peripheral areas of the measured points.

33. The system of claim 32, further comprising means for generating a virtual LC ring and connecting all real points at the boundaries to generate a virtual LC ring mask; and multiplying the virtual mask with the coefficient matrix.

* * * * *